United States Patent
Ficklscherer (10) Patent No.: US 9,382,847 B2
(45) Date of Patent: Jul. 5, 2016

(54) ROTOR RESONANCE DISTURBANCE REJECTION CONTROLLER

(71) Applicant: Pratt & Whitney Canada Corp., Longueuil (CA)

(72) Inventor: Peter Ficklscherer, Schoefweg (DE)

(73) Assignee: PRATT & WHITNEY CANADA CORP., Longueuil (CA)

( * ) Notice: Subject to any disclaimer, the term of this patent is extended or adjusted under 35 U.S.C. 154(b) by 854 days.

(21) Appl. No.: 13/667,705

(22) Filed: Nov. 2, 2012

(65) Prior Publication Data

US 2014/0123663 A1 May 8, 2014

(51) Int. Cl.
*F02C 9/00* (2006.01)
*F02C 9/26* (2006.01)

(52) U.S. Cl.
CPC ... *F02C 9/00* (2013.01); *F02C 9/26* (2013.01); *F05D 2220/329* (2013.01); *F05D 2260/96* (2013.01); *F05D 2270/02* (2013.01); *F05D 2270/304* (2013.01)

(58) Field of Classification Search
CPC ............ F05D 2260/96; F05D 2270/02; F05D 2270/304
See application file for complete search history.

(56) References Cited

U.S. PATENT DOCUMENTS

| | | | |
|---|---|---|---|
| 4,411,595 A | 10/1983 | Pisano | |
| 4,423,592 A * | 1/1984 | Evans | F02C 9/28 60/39.281 |
| 4,468,924 A * | 9/1984 | Moore | F02C 9/28 60/226.1 |
| 4,531,361 A | 7/1985 | Zagranski et al. | |
| 5,189,620 A | 2/1993 | Parsons et al. | |
| 6,195,982 B1 | 3/2001 | Gysling et al. | |
| 6,729,139 B2 * | 5/2004 | Desai | B64C 27/001 60/39.281 |
| 6,986,641 B1 | 1/2006 | Desai et al. | |
| 7,042,110 B2 | 5/2006 | Mikhail et al. | |
| 7,423,352 B2 | 9/2008 | Suryanarayanan et al. | |
| 7,926,287 B2 | 4/2011 | Ullyott et al. | |
| 8,829,701 B2 * | 9/2014 | Ficklscherer | F02C 9/00 290/52 |
| 2007/0245746 A1 * | 10/2007 | Mollmann | F02C 9/28 60/779 |
| 2010/0141193 A1 * | 6/2010 | Rotondo | F01D 15/08 318/432 |

* cited by examiner

*Primary Examiner* — Lorne Meade
(74) *Attorney, Agent, or Firm* — Norton Rose Fulbright Canada LLP

(57) ABSTRACT

A speed control system for an engine comprising at least one rotary load is provided. The speed control system may include a rotor speed controller configured to regulate speed in the rotary load based on a sensed rotor speed, exclusive of resonant mode speed oscillations, in closed loop feedback with a commanded rotor speed. To provide active damping of resonant mode speed oscillations, a resonance disturbance rejection controller may be configured to compensate a speed control signal by observing a component of the sensed rotor speed that is due to resonant mode oscillations. Based on the observed resonance component, the resonance disturbance rejection controller may compute an adjustment value for the speed control signal. In the particular case of gas turbine engines, the resonance disturbance rejection controller may effect active damping by compensation of a fuel flow request for a gas generator.

12 Claims, 8 Drawing Sheets

ROTOR RESONANCE DISTURBANCE REJECTION CONTROLLER

TECHNICAL FIELD

The disclosure relates generally to rotor speed control and more particularly to a speed control system for rejecting rotor resonance disturbances acting on rotary loads in engines.

BACKGROUND

The drive train in certain rotary wing aircraft, such as helicopters, may be powered by a turboshaft engine that includes a gas generator and a free turbine, for example, which can be mechanically coupled to the main and tail rotors of the aircraft, respectively. If weakly damped, the rotor shaft in such drive trains may exhibit moderate to strong resonance at certain frequencies, for example, in or around the 2-8 Hertz (Hz) range. While some damping of the free rotor resonance modes may be provided by aerodynamic drag on rotor blades, gearbox reductions, and/or mechanical losses, without provision of additional damping, such free rotors may experience sizable speed oscillations at or near their resonant frequency(ies).

Disturbances such as exposure to a large wind gust or a sudden change in pitch may cause free rotors to "ring", i.e., develop speed oscillations that can last for seconds in some cases. Sufficiently large and long lasting speed oscillations may adversely affect stability and/or speed control in the aircraft.

One approach to regulating rotor shaft speed in certain turboshaft engines is to employ a closed loop feedback control system that regulates fuel supply to the engine's gas generator based on the sensed rotor speed of the free turbine or coupled rotor shaft. For example, such control systems may utilize a free turbine speed controller responsive to an error signal generated between sensed and commanded rotor speed. However, to avoid potentially de-stabilizing resonant frequency excitation within the free turbine control path, certain gas generator fuel control systems incorporate a passive filter in order to suppress and prevent the free turbine speed controller from acting on components of the sensed rotor speed that may be attributable to rotor resonance. Because of such signal suppression, many gas generator fuel control systems of this general configuration will not enhance, and in fact may tend to decrease, the amount of inherent damping that might otherwise act on a free turbine or coupled rotor shaft.

SUMMARY

In at least one broad aspect, the disclosure provides a speed control system for a gas turbine or other type of engine that includes at least one rotary load, which may be turbine-driven. The speed control system may include, among other control elements or components, a rotor speed controller and a resonance disturbance rejection controller. The rotor speed controller may be configured to generate a speed control signal based on a rotor speed signal, which may be representative of a sensed rotor speed, so as to regulate speed in the rotary load.

The resonance disturbance rejection controller may be configured to generate a resonance compensation signal based on a resonance component of the rotor speed signal, which resonance component may be representative of speed oscillations in the rotary load that are caused at least partially by development of a resonance condition acting on the rotary load. The resonance disturbance rejection controller may further be configured to adjust the speed control signal based on the resonance compensation signal so as to effect active damping of the speed oscillations.

In at least one other broad aspect, the disclosure provides a resonance disturbance rejection controller for a gas turbine or other type of engine that includes at least one rotary load, the speed of which is regulated using a speed control signal. The resonance disturbance rejection controller may be implemented by at least one processor configured to generate a resonance compensation signal based on a resonance component of a rotor speed signal, which rotor speed signal may be representative of a sensed speed of the rotary load, and which resonance component may be representative of speed oscillations in the rotary load caused by development of a resonance condition acting on the rotary load. The resonance disturbance rejection controller may be further configured to adjust the speed control signal based on the resonance compensation signal so as to effect active damping of the speed oscillations.

According to either of the above two aspects, optionally, a resonance disturbance rejection controller may include an acceleration estimator configured to estimate an acceleration component associated with the speed oscillations based on the resonance component of the rotor speed signal, and a speed control compensator configured to generate the resonance compensation signal so as to provide an adjustment value for the speed control signal determined based on the estimated acceleration component.

In some embodiments, optionally, the acceleration estimator may include a state observer configured to observe the resonance component of the rotor speed signal, and to estimate the acceleration component based on the observed resonance component and a state model of the speed oscillations. Optionally, the state model may include a second order oscillator.

In some embodiments, optionally, the speed control compensator may include a gain multiplier configured to calculate the adjustment value by applying a gain factor to the estimated acceleration component.

In some embodiments, optionally, the speed control system may further include a signal separator configured to filter the rotor speed signal into the resonant component and an average speed component that is representative of an average speed in the rotary load determined exclusive of the speed oscillations. In such cases, the rotor speed controller may be configured to generate the speed control signal based on the average speed component.

In some embodiments, optionally, the engine may include a gas generator coupled to at least one turbine for driving the rotary load, in which case the speed control signal determined by the rotor speed controller may be configured to regulate speed in the turbine-driven rotary load by controlling fuel flow to the gas generator.

In at least one other broad aspect, the disclosure provides a method of controlling speed in a gas turbine or other type of engine that includes at least one rotary load. The method may include regulating rotor speed in the rotary load based on a sensed speed of the rotary load, and determining a resonance component of the sensed rotor speed that is representative of speed oscillations in the rotary load caused by development of a resonance condition acting on the rotary load. The method may further include adjusting the regulated rotor speed based on the determined resonance component so as to effect active damping of the speed oscillations.

According to the above aspect, optionally, the method may further include estimating an acceleration component associated with the speed oscillations based on the resonance component of the sensed speed, and determining an adjustment value for the regulated speed based on the estimated acceleration component.

In some embodiments, optionally, the method may further include observing the resonance component of the sensed speed, and estimating the acceleration component based on the observed resonance component and a state model of the speed oscillations. In such cases, the rotor speed oscillations may be modeled as a second order oscillator.

In some embodiments, optionally, the method may further include calculating the adjustment value by applying a gain factor to the estimated acceleration component.

In some embodiments, optionally, the method may further include filtering the sensed speed into the resonant component and an average speed component that is representative of an average speed in the rotary load determined exclusive of the speed oscillations, and regulating speed in the rotary load based on the average speed component.

In some embodiments, optionally, the engine may include a gas generator coupled to at least one turbine for driving the rotary load, in which case speed in the turbine-driven rotary load may be regulated by controlling fuel flow to the gas generator.

With such arrangement(s) and/or process(es) for speed control in rotary loads, such as those found in many engine configurations, rotor resonance disturbances may be substantially rejected or ameliorated during operation.

Further details of these and other aspects of the described embodiments will be apparent from the detailed description below.

BRIEF DESCRIPTION OF THE DRAWINGS

Reference is now made to the accompanying drawings, in which.

DETAILED DESCRIPTION OF EMBODIMENTS

To provide a thorough understanding, various aspects and embodiments of machines according to the disclosure, including at least one preferred embodiment, are described with reference to the drawings.

Figure 1:
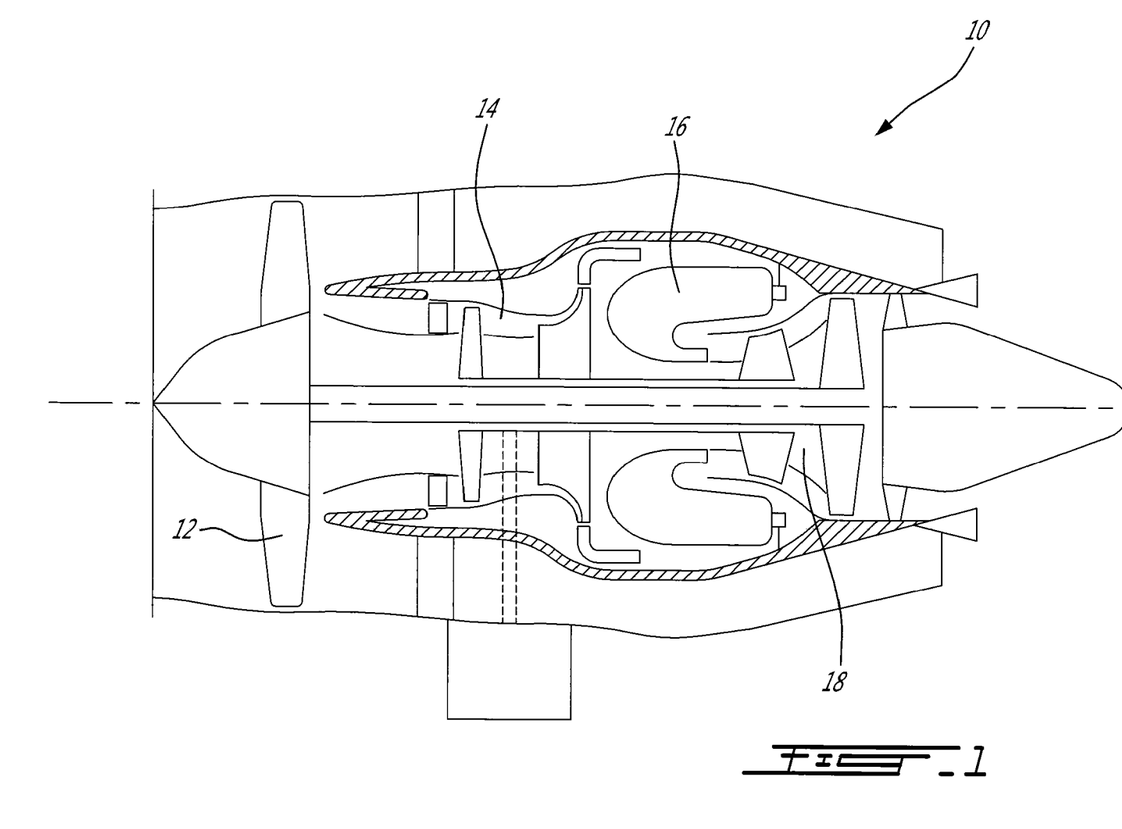
FIG. 1 shows an axial cross-sectional view of a turbofan gas turbine engine.

Reference is initially made to FIG. 1, which illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
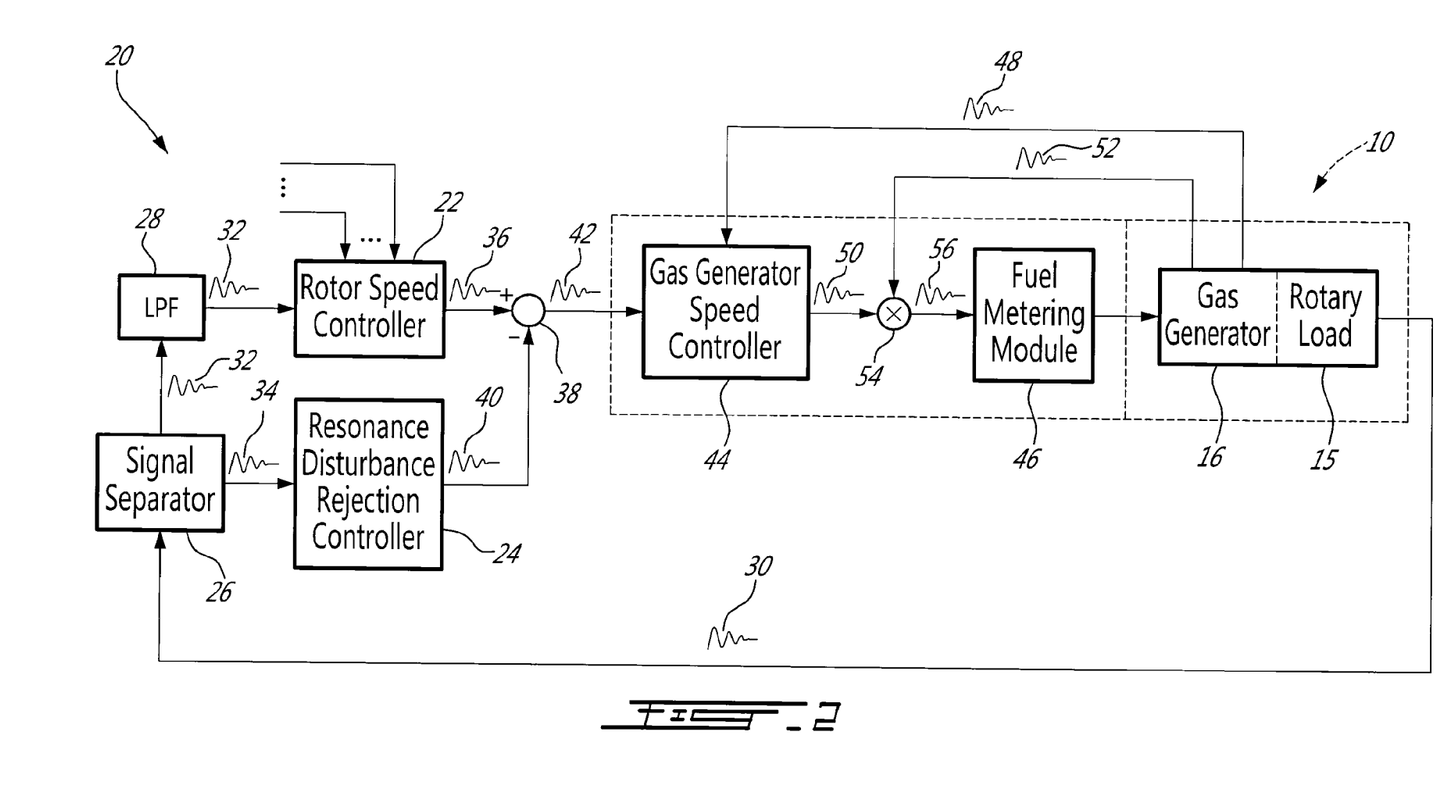
FIG. 2 shows a schematic diagram of a speed control system for an engine, such as a gas turbine, which includes at least one rotary load.

Referring now to FIG. 2, there is generally shown a speed control system 20 that may be suitable for controlling speed in a rotary engine, such as a turboshaft or turbofan engine, which has one or more rotary loads 15 mechanically coupled to turbine-driven rotor shaft(s). Speed control system 20 may in particular be suitable for operation with gas turbine engines, such as gas turbine engine 10 shown in FIG. 1, which include a gas generator or other combustion source (e.g., combustor 16 in FIG. 1) coupled in drive formation to one or more turbines (e.g., turbine section 18 in FIG. 1). Such turbine(s) may be included as part of an engine spool, such as an entity spool for a compressor or fan. Alternatively, such turbine(s) may include one or more free turbines (sometimes referred to as a power turbine) that is/are mechanically de-coupled to the remainder of the engine, e.g., as in the power section of a turboshaft engine.

While described specifically with reference to different types and/or configurations of rotary engines, such reference is merely for convenience and illustrative purposes only. It will be understood therefore that speed control system 20 is not necessarily limited only to such applications and/or uses in turbofan or turboshaft engines. In alternative embodiments, speed control system 20 may be utilized within other types and/or configurations of rotary engines, such as steam turbine, electrical motor, and still others.

For clarity and convenience, certain elements of speed control system 20 are illustrated explicitly in the embodiment of FIG. 2. However, it may be possible or suggested within the context of the present disclosure that other elements not explicitly shown may be included in speed control system 20 without substantially affecting operation of those elements which are shown. Certain elements are control system 20 are also illustrated explicitly as separate or discrete unit(s) or module(s) or component(s). Such grouping(s) of elements may be convenience and for the purpose of clarity so as to facilitate explanation of the operation of speed control system 20; other grouping(s) of elements may be possible in alternative embodiments without affecting operation of speed control system 20.

Different elements or components or modules of speed control system 20 may be realized using any industrially convenient or expedient technology(ies) and, without limitation, may be implemented using software component(s), hardware component(s), or any combination of hardware and software component(s), and may also include firmware component(s). For example, one or more different elements or modules of speed control system 20 may be implemented on or using one or more microprocessors, central processing units (CPU), digital signal processors (DSP), arithmetic logic units (ALU), physics processing units (PPU), general purpose processors (GPP), field-programmable gate arrays (FPGA), application specific integrated circuits (ASIC), or the like, which are generally referred to herein as a "processor" or alternatively as "processor(s)".

So as to execute stored program instructions or other code, any or each of the above-noted processor(s) may be linked for communication with one or more different computer readable media on which program instructions or other code may be stored persistently or otherwise. Such computer readable media may include program and/or storage memory, including volatile and non-volatile types, such as type(s) of random access memory (RAM), read-only memory (ROM), and flash memory. Moreover, any or each of the above-noted processors may be equipped with one or more different logic or processing modules for executing such program instructions or code, as well as other types of on- or off-board functional units, such as analog to digital converters (ADC), digital to analog converters (DAC), transistor-to-transistor logic (TTL) circuits, or the like.

Speed control system 20 may further include one or more different sensors or other measurement devices for measurement of different physically measurable parameter(s) of a rotary or other type of engine, and based upon or in association with which speed control system 20 may operate. Additionally, speed control system 20 may include one or more suitable actuators, examples of which may be described further below, for effecting controlled change of different physical parameter(s) within or in conjunction with a rotary or other type of engine.

Embodiments of a speed control system 20 will be described in the example context of a speed control path for regulation of a rotary load 15, e.g., which might be included in certain configurations of turbofan or turboshaft engines. However, it will be appreciated that the invention(s) described herein are not limited by such embodiments and that additional uses and/or contexts for a speed control system 20 may be apparent. For example, certain embodiments of a speed control system 20 may be suitable for use with other types of rotary loads, the speed of which may be regulated, and in which it may be desirable, necessary or otherwise advantageous to damp rotor speed fluctuations caused by or attributable at least partially to development of a resonance condition acting on the rotary load. The specific examples described are not limiting.

Accordingly, speed control system 20 may in certain embodiments include a rotor speed controller 22, a resonance disturbance rejection controller 24, a signal separator 26 and, optionally, a filter 28. Rotor speed controller 22 may receive as inputs a number of different control signals, for example, including a commanded or requested rotor speed (i.e., a primary speed control command supplied by a pilot or operator) and/or a collective pitch command signal, which may be utilized to regulate one or more parameters of rotary load 15, such as rotor speed. For example, rotor speed controller 22 may be configured as a primary (outer) controller in a closed-loop speed control system.

To effect speed control of a rotary load 15 (such as fan 12 in a gas turbine engine 10 or a power turbine of a turboshaft engine), rotor speed controller 22 may also be provided with a feedback signal that is representative of a sensed speed ($\Omega$) within such rotary load 15 and, based upon which, rotor speed controller 22 may generate an error signal for effecting speed control in rotary load 15. For example, rotor speed controller 22 may generate such an error signal as a difference between commanded rotor speed and sensed rotor speed ($\Omega$). Speed control may also be effected by rotor speed controller 22 using a proportional-integral-derivative (PID) control path, or any useful alternative thereto, such as proportional-derivative (PD) or proportional-integral (PI) control paths.

In the embodiment shown in FIG. 2, signal separator 26 may receive a rotor speed signal 30 generated by a rotor sensor, e.g., a Hall effect sensor or the like, which is installed on rotary load 15 for measuring rotor speed. Rotor speed signal 30 may therefore be representative of sensed rotor speed ($\Omega$) of such rotary load 15 and, in general, may include a number of different frequency components that combine in the aggregate to provide the sensed rotor speed ($\Omega$) with an overall frequency characteristic or spectrum.

For example, the sensed rotor speed ($\Omega$) may include an average speed component ($\Omega_0$) that is representative of an average speed experienced by rotary load 15, superimposed onto which may be speed oscillations introduced by external factors or other system characteristics of a rotary engine. Such average speed component ($\Omega_0$) may be a dc or near dc value when rotary load 15 is operating at or in steady state. Alternatively, an average speed component ($\Omega_0$) may be a relatively low frequency signal when rotary load 15 is undergoing commanded speed changes, controlled transients, or is subject to other external disturbances, such as gusts of wind, pitch changes, and the like.

In addition to the average speed component ($\Omega_0$), sensed rotor speed ($\Omega$) may also include a resonance component ($\omega$) that is representative of speed oscillations exhibited by rotary load 15 in response to a resonance condition, such as a torsional resonance, which is developed within rotary load 15. As noted above, certain types or configurations of rotary or other engines may resonate at a frequency(ies) somewhere in or near the range of 2-8 Hz, which can cause "ringing" and other generally undesirable transients in rotor speed that may affect overall stability and/or controllability of such rotary load 15. Within a strongly inert or heavily loaded mechanical system, a resonant component ($\omega$) may be comparatively high frequency in relation to an average speed component ($\Omega_0$).

The average speed component ($\Omega_0$) and resonance component ($\omega$), as defined above, may constitute predominant components of sensed rotor speed ($\Omega$), with additional frequency components, e.g., due to noise or non-idealities within rotary load 15, being relatively small in magnitude in comparison. Accordingly, in some embodiments, the average speed component ($\Omega_0$) may be approximately determined as the full-spectrum rotor speed ($\Omega$) filtered of the resonance component ($\omega$). Thus, in some embodiments, the average speed component ($\Omega_0$) may be determined mutually exclusive of the resonance component ($\omega$).

In some embodiments, signal separator 26 may be configured to receive and filter the rotor speed signal 30 into two or more different component signals including an average rotor speed signal 32, which may be representative of the average speed component ($\Omega_0$), and a resonant mode signal 34, which may be representative of the resonant component ($\omega$). Different possible embodiments of a signal separator 26 are discussed below in greater detail with reference to FIGS. 3A-3C.

As shown in the embodiment of FIG. 2, signal separator 26 is depicted as a discrete functional block. However, in alternative embodiments, signal separator 26 may be realized using two or more inter-connected or associated functional blocks, including suitably designed filter(s), which perform substantially the same or an equivalent function as filtering rotor speed signal 30 into two or more different component signals. Moreover, in some embodiments, signal separator 26 may be included within and form part of resonance disturbance rejection controller 24. Alternatively, signal separator 26 and resonance disturbance rejection controller 24 may be separate components as depicted in the illustrated embodiment.

Signal separator 26 may provide resonant mode signal 34 to the resonance disturbance rejection controller 24 as a control input used for active damping of speed oscillations in rotary load 15 that are caused, e.g., by torsional resonance. Signal separator 26 may also provide average rotor speed signal 32 to rotor speed controller 22 as a control input used for speed regulation or other associated speed control of rotary load 15.

Optionally, as in the embodiment shown in FIG. 2, average rotor speed signal 32 may be provided to the rotor speed controller 22 via filter 28, which can have a low-pass filter characteristic of any suitable order, configuration and/or type. Filter 28 may be included in speed control system 20 to provide additional filtering of average rotor speed signal 32, e.g., to further suppress or attenuate residual frequency content that passed through signal separator 26, including at frequencies commonly associated with torsional resonance. However, in some embodiments, filter 28 may be omitted from speed control system 20, in which case signal separator 26 may provide average rotor speed signal 32 to rotor speed controller 22 without additional filtering.

As described above, rotor speed controller 22 may construct an error signal as a difference between a commanded rotor speed control input and the average speed component ($\Omega_0$) of sensed rotor speed ($\Omega$) as represented by average rotor speed signal 32. Based upon such error signal, rotor speed controller 22 may be configured to generate a speed control signal comprising control value(s) calculated so as to regulate or otherwise control speed in rotary load 15.

For example, in the illustrated embodiment, where speed control system 20 is utilized in conjunction with a turbofan gas turbine engine 10 having one or more gas generator(s) 16, rotor speed controller 22 may be configured to generate a gas generator request signal 36 that performs speed control in rotary load 15 ultimately by controlling fuel flow to gas generator(s) 16. However, in alternative embodiments, where speed control system 20 is utilized with other configurations of engines, rotor speed controller 22 may be configured to generate a speed request signal or other form of speed control signal not based on controlling fuel flow to a gas generator.

Gas generator request signal 36 (or other speed control signal generated by free rotor speed controller 22) is provided to summing junction 38 for level adjustment by a resonance compensation signal 40 generated by the resonance disturbance rejection controller 24. The resonance compensation signal 40 may be generated by resonance disturbance rejection controller 24 based on the resonant component ($\omega$) of sensed rotor speed ($\Omega$), as represented by resonant mode signal 34, so as to ameliorate or reduce any potentially adverse performance of rotary load 15, such as that due to torsional load resonance. Summing junction 38 thereby generates a compensated gas generator request signal 42 (more generally, a resonance compensated speed control signal), which is provided to one or more downstream control elements and/or actuators within speed control system 20 for performing resonance-compensated speed control of rotary load 15.

Accordingly, in some embodiments, the resonance disturbance rejection controller 24 may generate the resonance compensation signal 40 so that the compensated gas generator request signal 36 may effect active damping of resonant mode speed oscillations within rotary load 15, in addition to performing rotor speed regulation. Without adjustment by resonance compensation signal 40, gas generator request signal 36 might typically effect little to no active resonant mode damping, for example, if summing junction 36 is bypassed. Such would also be the case if, for example, resonance disturbance rejection controller 24 were omitted from or, optionally, were to be de-activated within speed control system 20, such as would be possible if provided with an optional enable/disable switch. Further discussion of resonance disturbance rejection controller 24 is provided below with reference to FIG. 4.

In the example embodiment shown in FIG. 2, suitable for operation with a gas turbine engine, speed control system 20 may further include gas speed controller 44 and fuel metering module 46, in addition to rotor speed controller 22 and resonance disturbance rejection controller 24. It will be understood that such additional modules, control elements and/or actuators may be specific to only one context in which speed control system 20. Description of such components is provided merely to illustrate operation of a rotor speed controller 22 and resonance disturbance rejection controller 24 within a speed control system 20 and is not intended to limit the described embodiments in any manner.

Gas generator speed controller 44 may be configured to receive compensated gas generator speed request signal 42 from summing junction 38. Alternatively, if resonance disturbance rejection controller 24 is omitted or de-activated, gas generator speed controller 44 may receive gas generator speed request signal 36 from rotor speed controller 22. More generally, gas generator speed controller 44 may receive either a speed control or resonance compensated speed control signal as a control input.

Gas generator speed controller 44 may also be configured to receive a sensed gas generator speed signal 48, which is representative of a detected speed within a gas generator 16 of gas turbine engine 10. For example, one or more speed sensors may be installed on gas generator(s) 16, and configured to generate and feed the sensed gas generator speed signal 48 back to gas generator speed controller 44 as a control input.

In some embodiments, as in common in many engine configurations, gas generator speed controller 44 may generate a pressure normalized fuel control signal 50 from an error signal constructed as a difference between compensated gas generator request signal 42 (or gas generator request signal 36) and sensed gas generator speed signal 48, which is then provided to a control path within gas speed controller 44. For example, such control path may be a generalized proportional-integral-derivative (PID) controller, or any suitable variation thereof, such as those mentioned above in the context of rotor speed controller 22. However, pressure normalized fuel control may represent only one possible approach for effecting speed control in a rotary engine, and that other types and configurations not based on pressure normalized fuel control are possible as well. Discussion of this example approach to rotary speed control is for convenience and clarity of explanation only.

Pressure normalized fuel control signal 50 may be generated so as to represent a requested fuel flow for the gas generator 16, per unit of compressor discharge pressure, which will achieve a commanded rotor speed in rotary load 15 (e.g., in accordance with the value input to rotor speed controller 22). Compressor discharge pressure within gas generator(s) 16 may be sensed and fed back as compressor discharge pressure signal 52, which is provided to multiplying junction 54 along with pressure scaled fuel control signal 50. By scaling the pressure normalized fuel control signal 50 by compressor discharge pressure signal 52, multiplying junction 54 may generate a fuel control signal 56, which may be representative of a total (as opposed to per unit) demanded fuel flow to the gas generator so as to achieve the commanded rotor speed, given the sensed compressor discharge pressure within gas generator 16.

Fuel control signal 56 may be provided to fuel metering module 46, which may be an electromechanical metering device configured to regulate actual fuel flow to the gas generator according to commanded level(s) given by fuel control signal 56. The pressurized fuel output from fuel metering module 46 may be provided as an input to gas generator(s) 16, which in turn generates streams of combustion gases that drive rotary load 15 according to the commanded rotor speed.

Speed control system 20 is shown in FIG. 2 and described within the context of an outer loop control path that includes rotor speed controller 22 and gas generator speed controller 44. However, in various embodiments, speed control system 20 may be configured alternatively so that resonance compensation signal 40 generated by resonance disturbance rejection controller 24 may be suitable for combination with other speed control signal(s) so as to effect active resonant mode damping of rotary load(s) 15, either in conjunction with rotor speed control or otherwise.

For example, in some embodiments, resonance compensation signal 40 may be configured for adjustment of pressure normalized fuel control signal 50 as opposed to gas generator request signal 36, in which case summing junction 38 may be provided between gas generator speed controller 44 and multiplying junction 54. More generally, in other embodiments, resonance disturbance rejection controller 24 may be configured to generate resonance compensation signal 40 for combination with any other speed control signal(s) so as to request a reduction in rotor speed that is commensurate with (and will thereby work to counteract) any resonant mode speed oscillations that may be sensed. The requested reduction in rotor speed may be reflected in terms of any variables or parameters that may be utilized by a speed control signal within speed control system 20.

In some embodiments, as described further below, resonance compensation signal 40 may also be generated to compensate for resonant mode speed oscillations on rotary load(s) 15 that are not simultaneously regulated or otherwise controlled to follow a commanded rotor speed. Such embodiments may be suitable for use with engines that include, for example, two or more rotary loads 15 are powered by a common energy source, e.g., a gas generator 16, under conditions in which it is only possible or desirable to regulate one rotary load 15 for speed. In such cases, resonant mode oscillations in each rotary load 15 may be compensated through adjustment of a speed control signal for the common energy source, which is adjusted using multiple resonance compensation signals 40, e.g., a different signal for each rotary load 15 being compensated.

Figures 3A, 3B, 3C, 4:
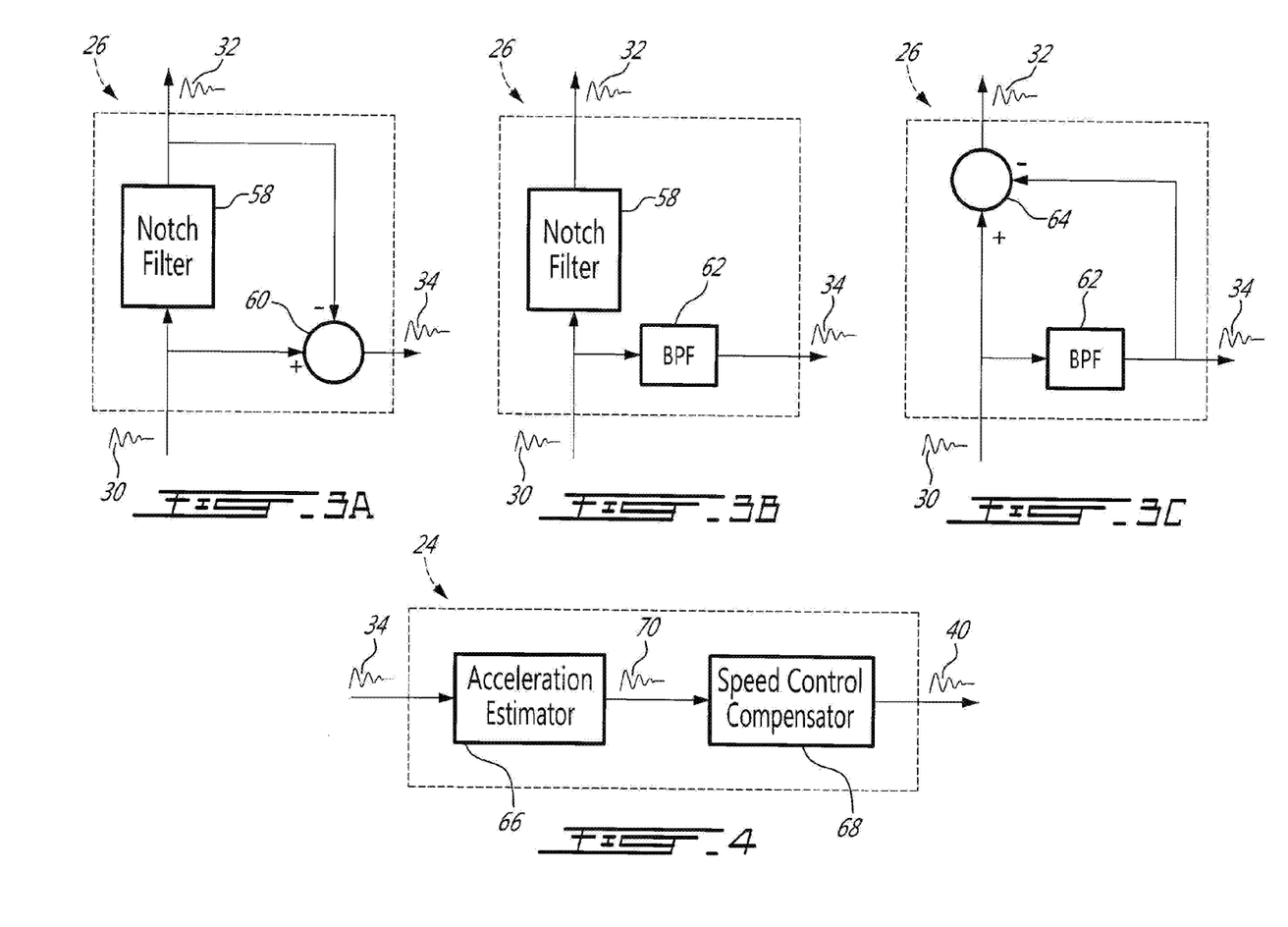
FIGS. 3A-3C schematically illustrate alternative embodiments of a signal separator that may be employed in the speed control system of FIG. 2.
FIG. 4 schematically illustrates an embodiment of a resonance disturbance rejection controller that may be employed in the speed control system of FIG. 2.

Referring now to FIGS. 3A-3C, some example configurations of a signal separator 26 are shown. In the embodiment shown in FIG. 3A, signal separator 26 may include a notch filter 58 and a summing junction 60. Notch filter 58 may receive the rotor speed signal 30 and be configured to suppress frequencies at or near the resonant frequency of rotary load 15, for example, within the range of 2-8 Hz. With such configuration of notch filter 58, signal separator 26 may be configured to generate and output the average rotor speed signal 32 to be representative of an average speed component ($\Omega_0$) of sensed rotor speed ($\Omega$), determined exclusive of any resonant component ($\omega$) that may also be present in the rotor speed signal 30 (but which is suppressed by operation of notch filter 58). For this purpose, any suitably configured notch filter 58 of any desired order and/or type or configuration may be designed and realized within signal separator 26, e.g., using hardware and/or software components, and based on finite impulse response (FIR) or infinite impulse response (IIR) filter functions.

Summing junction 60 may be connected across notch filter 58 so as to calculate a difference between the rotor speed signal 30 which is input to signal separator 26 and the average rotor speed signal 32 output from signal separator 26. A resonant mode signal 34 may thereby be generated by summing junction 60 to be representative of a resonant component ($\omega$) of sensed rotor speed ($\Omega$). Because notch filter 58 is configured to substantially suppress a resonant component ($\omega$) of sensed rotor speed ($\Omega$), the mathematical difference of the input to, and output from, notch filter 58 may approximate such a resonant component ($\omega$).

For configurations of a speed control system 20 in which notch filter 58 (or equivalent) may already included so as to prevent resonant mode excitation within a rotor speed control outer loop path, as noted above, a signal separator 26 may be realized by addition only of summing junction 60 to operate in combination with pre-existing notch filter 58. The configuration of signal separator 26 shown in FIG. 3A in some cases may therefore represent a relatively simple and cost effective implementation as compared to other possible configurations, examples of which are described below.

Alternatively, as seen from the embodiment of FIG. 3B, a signal separator 26 may be implemented using a band pass filter 62 in replacement of summing junction 60. In such arrangement(s), band pass filter 62 may be configured to have an inverse relationship or filter characteristic to notch filter 58, such that band pass filter 62 may provide a pass band centered around and encompassing a range of frequencies in which resonant mode oscillations within a gas turbine engine are likely to manifest. For example, band pass filter 62 may have a pass band of approximately 2-8 Hz as defined by the inverse characteristic of notch filter 58, which is configured to suppress frequencies in this frequency range.

Similar to the configuration of a signal separator 26 shown in FIG. 3A, the signal separator 26 shown in FIG. 3B may thereby receive a rotor speed signal 30 and, using band pass filter 62, filter out an average speed component ($\Omega_0$) of a sensed rotor speed ($\Omega$) to generate a resonant mode signal 34. Optionally, additional signal shaping for bandwidth separation may be provided to reduce distortion introduced by resonant frequency variation and possible discrepancies in the inverse filter relationship between notch filter 58 and band pass filter 62. While configuration of a band pass filter 62 as the inverse of notch filter 58 may generally be possible, the skilled person will appreciate that such configuration may add complexity and/or cost as compared to other possible configurations (e.g., as shown in FIG. 3A or 3C), and therefore may be less practical for certain uses and/or applications of a speed control system 20.

Alternatively, as seen from the embodiment of FIG. 3C, a signal separator 26 may be implemented using the band pass filter 62 and a summing junction 64 in replacement of the notch filter 58. As in the embodiment of FIG. 3B, band pass filter 62 may be configured with a pass band centered around and encompassing a range of frequencies in which resonant mode oscillations acting on a rotary load are likely to develop. Accordingly, band pass filter 62 may again pass a resonant component ($\omega$) of the sensed rotor speed ($\Omega$) as a resonant mode signal 34, while substantially suppressing an average speed component ($\Omega_0$) lying outside of the pass band of bass pass filter 62.

To generate an average rotor speed signal 32 representative of the average speed component ($\Omega_0$), summing junction 64 may calculate the difference between rotor speed signal 30 and resonance mode signal 34 provided by band pass filter 62. Being generated as a difference taken across the input and output of band pass filter 62, the average rotor speed signal 32 may be ensured of having good signal isolation from the resonance mode signal 34. As in the embodiment of shown in FIG. 3A, good isolation of these signals may enhance performance of a rotor speed controller 22 and a resonance rejection disturbance controller 24.

In any of the embodiments shown in FIGS. 3A-3C, signal separator 26 may be configured so as to separate an average speed component ($\Omega_0$) and a resonant component ($\omega$) of a sensed rotor speed ($\Omega$), and to pass each such component of the sensed rotor speed (Ω) separately to different elements of speed control system 20. Alternatively, embodiments of a signal separator 26 may be configured to only generate a resonance mode signal 34 that is representative of a resonant component (ω). Such embodiments may be useful, for example, in respect of rotary loads that are compensated for resonant mode oscillations, but which are not simultaneously regulated for speed. Further description of such embodiments is provided below with reference to FIG. 5B.

Referring now to FIG. 4, there is shown an example embodiment of resonance disturbance rejection controller 24, which includes an acceleration estimator 66 and a speed control compensator 68. Acceleration estimator 66 may be configured to receive the resonant mode signal 34 and generate an estimated rotor acceleration signal 70 based upon the resonant component (ω) of the sensed rotor speed (Ω). The acceleration estimator 66 may generate the estimated rotor acceleration signal 70 to provide an estimate of an acceleration component experienced by a rotary load 15 (FIG. 2), for example, in association with a torsional resonance condition acting on the rotary load 15 and causing speed oscillations, i.e., which are represented by the resonant component (ω). As described further below, the associated acceleration component experienced by rotary load 15 may, in practical terms, be difficult or impossible to measure accurately. Accordingly, rejection disturbance rejection controller 24 may operate instead based on an internally generated estimate of the acceleration component.

Speed control compensator 68 may be configured to translate or otherwise transform the estimated rotor acceleration signal 70 into an adjustment value to be applied to the gas generator request signal 36 (FIG. 2), thereby to effect active damping of speed oscillations in the rotary load 15. Generally, speed control compensator 68 may determine the adjustment value based on the estimated acceleration component so as to request a speed reduction in rotary load 15 that will counteract, at least partially, any rotor acceleration associated with the speed oscillations. Generating the adjustment value to have such effect may also ensure that associated speed oscillations within rotary load 15 are actively damped in accordance with the instigating resonance condition.

In some embodiments, acceleration estimator 66 may include a suitably configured state observer, such as a Kalman filter, a Luenberger observer, or like components. To construct the state observer, resonant mode speed oscillations in rotary load 15 may be modeled using a state model of a second order oscillator according to:

$$\begin{bmatrix} \dot{\omega} \\ \ddot{\omega} \end{bmatrix} = \begin{bmatrix} 0 & 1 \\ -\omega_0^2 & 0 \end{bmatrix} \begin{bmatrix} \omega \\ \dot{\omega} \end{bmatrix}, \quad (1)$$

where parameter ω represents the measured frequency of the resonant mode speed oscillations, and parameter $\omega_0$ represents the resonant frequency of the second order oscillator upon which the state model is constructed. In the state model given by equation (1), parameter ω may also represent the modeled state variable and be measureable (e.g., using an appropriate sensor, such as a Hall effect sensor mounted on rotary load 15). Moreover, parameters $\dot{\omega}$ and $\ddot{\omega}$ may represent first and second derivatives of the modeled state variable, respectively, and may not be either physically or practically measurable.

Using the state model given by equation (1), a state observer may be designed and configured according to:

$$\begin{bmatrix} \dot{\hat{\omega}} \\ \ddot{\hat{\omega}} \end{bmatrix} = \begin{bmatrix} 0 & 1 \\ -\omega_0^2 & 0 \end{bmatrix} \begin{bmatrix} \hat{\omega} \\ \dot{\hat{\omega}} \end{bmatrix} + \begin{bmatrix} L_1 \\ L_2 \end{bmatrix} [\omega - \hat{\omega}], \quad (2)$$

where parameter ω again represents the measurable state variable, parameter $\hat{\omega}$ represents an estimate of the measurable state variable ω, and parameters $L_1$ and $L_2$ represent suitably chosen gain values for the state observer. Moreover, parameters $\dot{\hat{\omega}}$ and $\ddot{\hat{\omega}}$ may represent first and second derivatives of the estimated state variable $\hat{\omega}$, respectively, and may represent output(s) for the state observer. The state observer given by equation (2) may thereby generate estimates of parameters that are not necessarily measurable.

Accordingly, in some embodiments, a state observer given by equation (2) may generate and output an estimated rotor acceleration ($\dot{\hat{\omega}}$) associated with resonant mode speed oscillations in rotary load 15 based on a measured resonance component (ω) of a sensed rotor speed (Ω) and a suitably chosen state model of such resonant mode speed oscillations, as given by equation (1) above.

As will be discussed further below with reference to FIGS. 7A-7C, the estimated rotor acceleration ($\dot{\hat{\omega}}$) generated by such a state observer may provide a relatively smooth, clean and/or in-phase, fast converging estimation of acceleration, as compared to other potential approaches for estimating acceleration based on a sensed rotor speed (Ω), such as derivative or filter based methods. Acceleration estimator 66 may output the estimated rotor acceleration ($\dot{\hat{\omega}}$) to speed control compensator 68 encoded or otherwise contained within estimated rotor acceleration signal 70.

As given by equations (1) and (2), acceleration estimator 66 may comprise an observer based on a model of a linear second order oscillator. However, in alternative embodiments, acceleration estimator 66 may comprise an observer based on a non-linear and/or adaptive model of a second order oscillator. Linear oscillator models may perform well where rotary load 15 exhibits relatively constant resonance frequency(ies), as may be the case where resonant frequency is predominantly dependent on physical properties of rotary load 15. However, non-linear or adaptive models may provide superior performance in association with a rotary load 15 having a non-linear or dynamic resonance, such as might occur where loading and/or other external flight conditions influence the performance of a rotary load 15.

While acceleration estimator 66 has been described specifically in the context of a state observer, such as a Kalman filter or a Luenberger observer, which is constructed by modeling rotor speed oscillations as a linear, non-linear and/or adaptive second order oscillator, for example, other types or configurations of an acceleration estimator 66 may also be suitable for use in a speed control system 20. For example, a state observer could be constructed using state models of different complexities, as is convenient and/or necessary, in replacement of the second order oscillator model explicitly described for convenience and clarity of explanation. Such other state models may provide higher order complexities, non-linearity and/or account for other transient or dynamic behaviours of resonant mode speed oscillations.

In some embodiments, speed control compensator 68 may be configured to calculate the adjustment value for the gas generator request signal 36 by applying a suitable transformation to the estimated rotor acceleration ($\dot{\hat{\omega}}$) generated by acceleration estimator 66. For example, speed control compensator 68 may include a gain multiplier for applying a gain factor to or otherwise scaling or translating the estimated rotor acceleration ($\hat{\omega}$) into an adjustment value. The applied gain factor may be pre-determined and stored within speed control compensator 68 or, alternatively, may be computed dynamically based on one or more parameters of gas turbine engine 10, rotary load 15, and/or speed control system 20.

Alternatively, the applied gain factor may be variable so as to provide the speed control compensator 68 with different responsivity(ies) to resonant mode speed oscillations and, thereby, to enable application of different damping factors based on need or for any other purpose. Thus, speed control compensator 68 in different embodiments may be configured to apply either a constant or adaptive (dynamic) gain factor, including gain scheduling.

However determined, the applied gain factor may be valued so that when torsional speed oscillations in free spinning turbines are observed (i.e., by non-zero valuation of the resonant mode signal 34), the resonance disturbance rejection compensator 24 generates the resonance compensation signal 40 to provide a commensurate reduction of the gas generator request signal 36 that at least partially counteracts the observed resonance condition and in such a way that speed oscillations to develop in response may be actively damped.

In some embodiments, speed control compensator 68 may alternatively, or in addition to a gain multiplier, include further control elements and/or paths for generating the resonance compensation signal 40. For example, speed control compensator 68 may include additional components, such as one or more integrators, which may alter or improve the dynamic performance of speed control compensator 68. The particular configurations of a speed control compensator 68 described herein are merely illustrative.

Figure 5A:
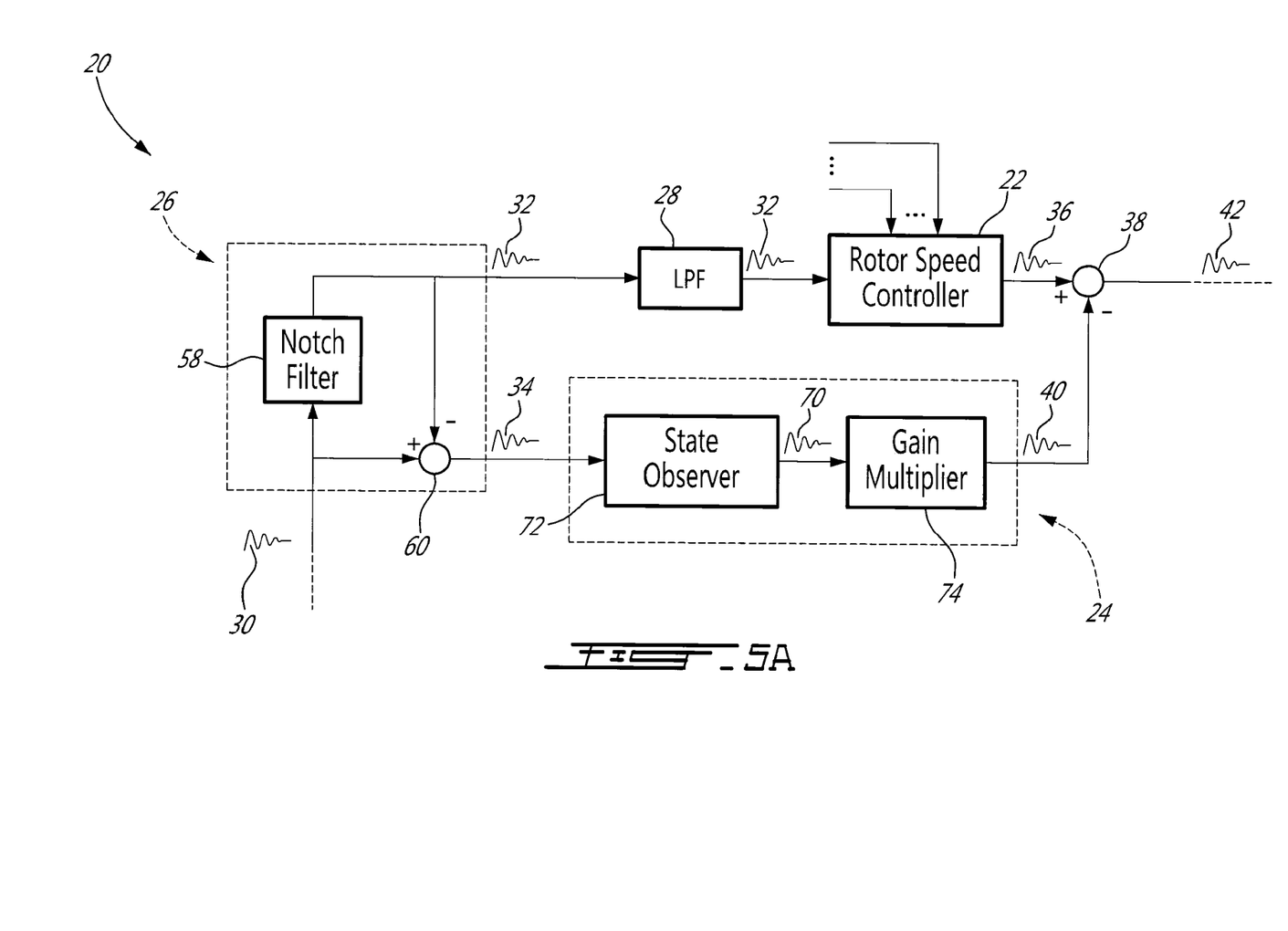
FIGS. 5A and 5B schematically illustrate, in part, alternative embodiments of the speed control system of FIG. 2.
Figure 5B:
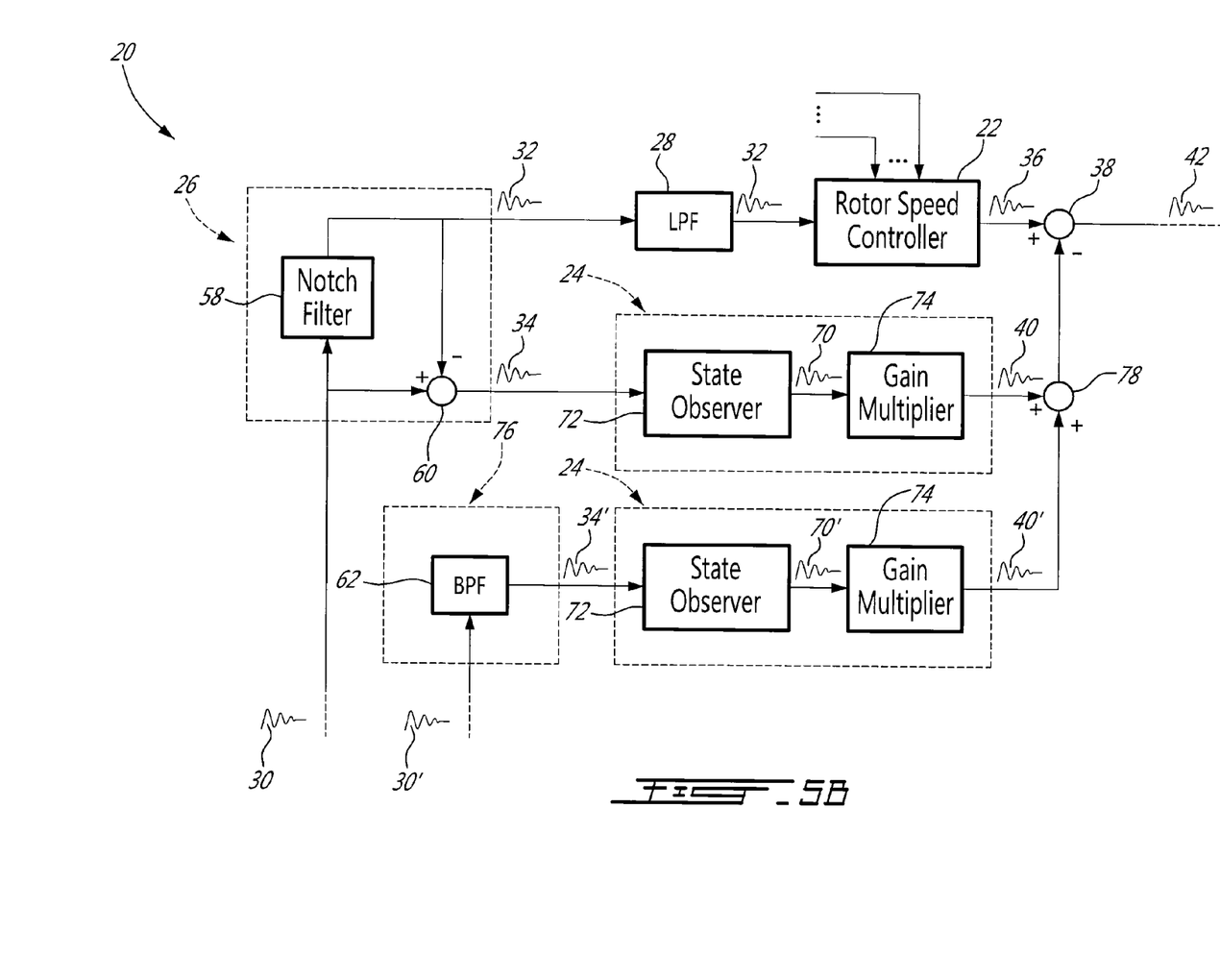

Referring now to FIGS. 5A and 5B, there are shown partial schematic diagrams of particular example embodiments of a speed control system 20 in accordance with the disclosure. The embodiment shown in FIG. 5A includes an outer control loop for combined speed regulation and active damping in a single rotary load, such as a fan in a turbofan engine or the rotary drive train in the power section of a turboshaft engine. The embodiment shown in FIG. 5B further includes an inner control loop for active damping of a second rotary load (in addition to the rotary load controlled in the outer loop) within an engine, such as the low pressure spool of a dual spool engine with power turbine.

In the illustrated embodiments, particular components are shown to implement a signal separator 26 and a resonance disturbance rejection controller 24. While the components shown may offer advantages and/or benefits in different applications, it will be appreciated that any of the embodiments and implementations described herein may be utilized. While illustrated for convenience in the context of an outer speed control path that is based on adjustment of a fuel flow request for a gas generator, it will be further appreciated that the embodiments are not limited to any one type or configuration of an outer speed control path.

In the embodiment shown in FIG. 5A, speed control system 20 includes rotor speed controller 22 and optional filter 28 in a primary control loop, while resonance disturbance rejection controller 24 is included in a secondary control loop. Signal separator 26 is provided with provided with a signal representative of a sensed rotor speed ($\Omega$) in a rotary load 15 (FIG. 2), which is separated into respective inputs for the outer and inner control loops, i.e., average rotor speed signal 32 and resonance mode signal 34, respectively. The primary control loop generates one or more speed control signals for regulating speed in the rotary load 15 according to a commanded or requested rotor speed, while the secondary control loop may be used to adjust one or more speed control signals in the primary control loop to thereby provide active damping of resonant mode speed oscillations observed in the rotary load 15.

As shown, resonance disturbance rejection controller 24 may include a state observer 72 and a gain multiplier 74 for generating a resonance compensation signal 40 based on a resonance component ($\omega$) of a sensed rotor speed ($\Omega$) provided to the state observer 72. The resonance compensation signal 40 is combined in summing junction 38 with a gas generator request signal 36 that is generated by rotor speed controller 22 based on an average speed component ($\Omega_0$) of the sensed rotor speed ($\Omega$) determined exclusive of the resonance component ($\omega$). Thereby, the summing junction 38 may provide a compensated gas generator request signal 42 that effects both speed regulation and active damping of resonant mode oscillations in rotary load 15.

Moreover, as particularly shown in FIG. 5A, signal separator 26 may include the combination of a notch filter 58 and summing junction 60 for separating the rotor speed signal 30 into average rotor speed signal 32 and resonance mode signal 34. The average rotor speed signal 32 may be representative of the average speed component ($\Omega_0$) and is provided to rotor speed controller 22 either directly or, alternatively, via filter 28, which may have a low-pass filter characteristic. The resonance mode signal 34 may be representative of the resonance component ($\omega$) and is provided to the state observer 72 of the resonance disturbance rejection controller 24.

Separation of the sensed rotor speed ($\Omega$) into an average speed component ($\Omega_0$) and a resonance component ($\omega$) may, in at least some cases, substantially decouple respective control processes executing in rotor speed controller 22 and resonance rejection disturbance controller 24. For example, configurations of a signal separator 26 that generate the resonance component ($\omega$) and the average speed component ($\Omega_0$) using inverse filter characteristics (e.g., FIGS. 5A and 5B embodiments) may tend to reduce controller interference by preventing or reducing signal leakage between rotor speed controller 22 and resonance rejection disturbance controller 24.

Referring now to FIG. 5B, in some embodiments, speed control system 20 may include more than one secondary control loop. For example, a secondary control loop may be included for each of a plurality of rotary loads to be compensated for speed oscillations. While two such secondary control loops are shown, the number is not limited and may vary for different engine configurations having different numbers of rotary loads. A primary control loop may also be included in respect of one of the rotary load that is also regulated for speed. In some embodiments, each rotary load may be driven by a common energy source, e.g., a gas generator 16 (FIG. 1) and therefore only one rotary load may be independently regulated for speed (the speed of the remaining rotary loads being dependent on the speed on the controlled load).

Accordingly, speed control system 20 may include a rotor speed controller 22 and optional filter 28 in the primary control loop and a version of a resonance disturbance rejection controller 24 in each secondary control loop. A signal separator 26 may separate a sensed rotor speed signal 30, which is representative of a sensed rotor speed ($\Omega$) for a speed regulated rotary load 15, into respective inputs for the primary control loop and one of the secondary control loops. For this purpose, signal separator 26 may include the combination of a notch filter 58 and summing junction 60, as described herein, which are configured to generate an average rotor speed signal 32 for input to rotor speed controller 22 and a resonance mode signal 34 for input to a resonance disturbance rejection controller 24.

A signal separator 76 may be included in rotor speed system 20 to separate or otherwise filter a sensed rotor speed signal 30' into a resonance mode signal 34' for input into a second resonance disturbance rejection controller 24. Second rotor speed signal 30' may be representative of a sensed rotor speed ($\Omega'$) for a non-speed regulated rotary load 15' (not shown but analogous to 15 shown in FIG. 2). Accordingly, signal separator 76 may comprise a band pass filter 62 configured with a pass band to filter or isolate the resonance component ($\omega$) from the sensed rotor speed ($\Omega$). Because speed in rotary load 15' (not shown) is unregulated and instead dependent on control of speed-regulated rotary load 15, suitable components for extracting an average speed component ($\Omega_0$) from the sensed rotor speed ($\Omega$) may be omitted.

Each resonance disturbance rejection controller 24 generates a resonance compensation signal 40, 40', which are summed together in summing junction 78 and applied to gas generator request signal 36 in summing junction 38. A compensated gas generator request signal 42 is thereby generated using adjustment values determined so as to compensate for resonance disturbances in each rotary load 15,15' (not shown). Even though only one such rotary load 15 may also be speed-regulated, each rotary load 15, 15' (not shown) may be driven by a common energy source, such as a gas generator, and therefore may be compensated using a signal gas generator request signal 42 for the common energy source.

As shown in FIG. 5B, each resonance disturbance rejection controller 24 may again include a state observer 72 and a gain multiplier 74 for generating a resonance compensation signal 40,40' based on a resonance component ($\omega$) of a corresponding sensed rotor speed ($\Omega$) determined in respect of a different rotary load 15,15' being compensated. As with the FIG. 5A embodiment, this particular implementation of a resonance disturbance rejection controller 24 is merely illustrative of different possibilities as described herein.

By way of example only, the FIG. 5A embodiment of a speed control system 20 may be suitable for use in a free turbine speed control loop of a single or multiple spool engine or, alternatively, for a single spool engine driving a rotary load, such as a compressor or a fan. Moreover, the embodiment of a speed control system 20 shown in FIG. 5B, which includes multiple secondary control loops, may be suitable for use in engines that include a high-pressure spool, a low-pressure spool, and a power turbine. In such cases, for example, the speed control system 20 may be employed to suppress power turbine and low-pressure spool resonance frequency oscillations (the primary control loop may be applied to regulate power turbine speed).

Figure 6:
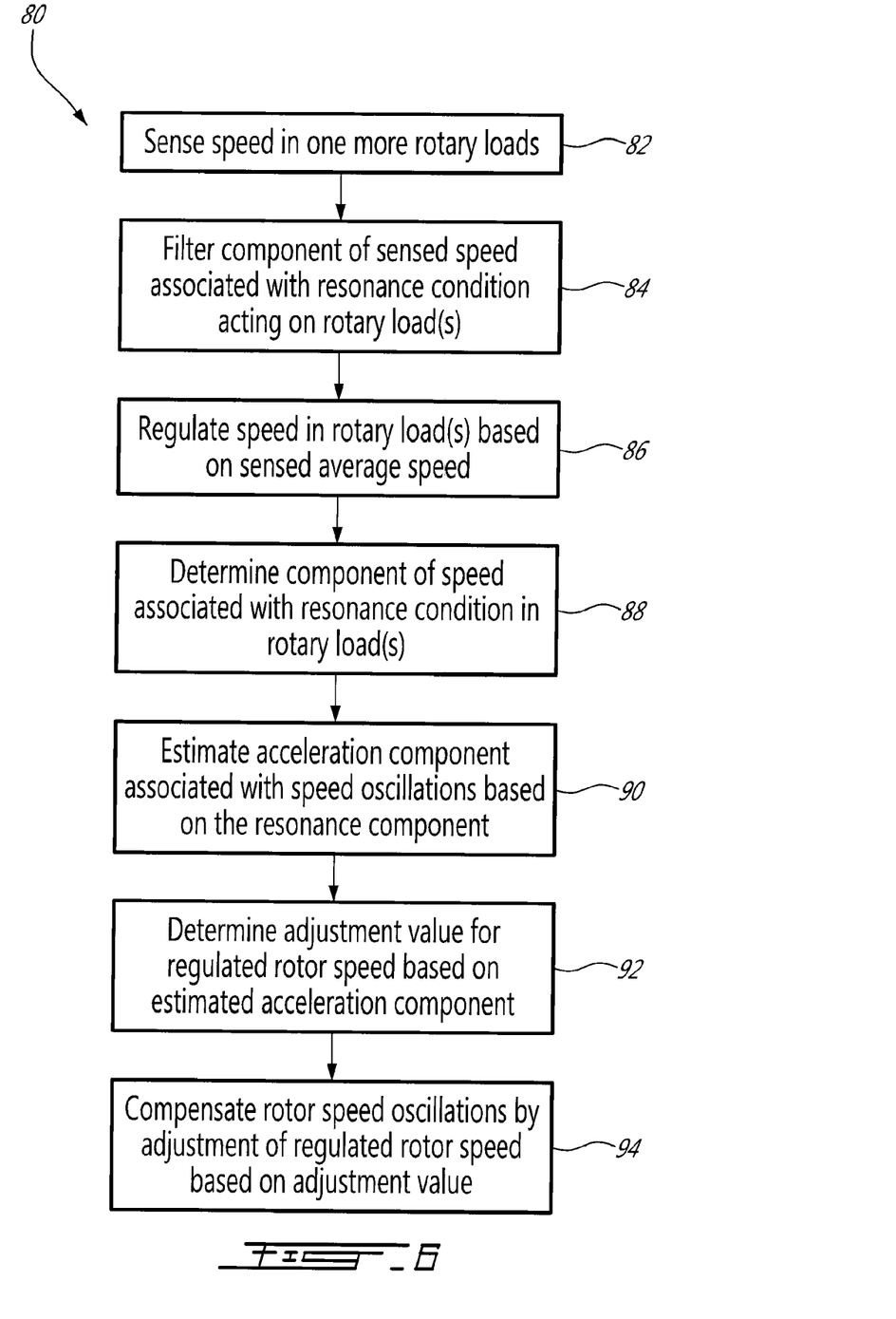
FIG. 6 shows a flow diagram illustrating an example method of controlling speed in an engine, such as a gas turbine engine, which includes at least one rotary load.

Referring now to FIG. 6, there is shown a flow chart for a method 80 of controlling speed in an engine, such as a turboshaft or turbofan engine, which includes at least one rotary load, and which may in some cases be driven by a turbine coupled to a gas generator or other combustion source. The method 80 may be performed using or in conjunction with one or more control or process elements, sensors and/or actuators operating in communication with an engine. For example, the method 80 may be performed using one or more different hardware, software and/or firmware components that have been programmed to execute process or control routines, such as, but not limited to, different components and elements of a speed control system 20, as described herein. For convenience, further details related to aspects of method 80 may be found above in description of speed control system 20.

For convenience, method 80 is illustrated using one or more discrete acts or blocks that are organized in a process flow. However, variations of method 80 may be possible so that one or more components of method 80 (e.g., as illustrated in one or blocks) may be combined with one or more other components of method 80 and/or be performed jointly therewith. In some cases, certain components of method 80 may be excluded. In some cases, additional acts or blocks may be performed within method 80. Except where reasonably implicit or to be inferred from surrounding context, no particular sequence of acts or blocks is required by method 80 and, in various embodiments, the specific acts and blocks illustrated in FIG. 6 may be performed either simultaneously or sequentially, either synchronously or asynchronously, either continuously or discontinuously, and, if convenient, in different possible order(s).

In some embodiments, method 80 may include sensing (82) speed in one or more rotary loads, for example, with use of a Hall effect or other suitable type of sensor installed on or otherwise configured to detect speed in such loads. The sensed rotor speed ($\Omega$) may include one or more different frequency components in a frequency spectrum, for example, including an average speed component ($\Omega_0$) and a resonance component ($\omega$). The average speed component ($\Omega_0$) may be a relatively large dc or near dc value, while the resonance component ($\omega$) may be relatively small and high frequency as compared to the average speed component ($\Omega_0$) for example, in the 2-8 Hz frequency range. In some cases, the resonance component ($\omega$) may be caused by naturally developing torsional resonance in the rotary load at certain frequency(ies) or frequency range(s).

The resonance component ($\omega$) may be filtered (84) from the sensed rotor speed ($\Omega$) to provide a signal that is representative of the average speed component ($\Omega_0$) without an appreciable component due to resonant mode speed oscillations. For example, a suitably configured notch or band stop filter may be used to filter (84) the resonance component ($\omega$) from the sensed rotor speed ($\Omega$).

Speed in the rotary load may be regulated (86) or otherwise controlled based a commanded or requested rotor speed together with the average speed component ($\Omega_0$) of the sensed rotor speed ($\Omega$) exclusive of the resonance component ($\omega$). For example, the commanded or requested rotor speed and the average speed component ($\Omega_0$) may be employed in closed loop feedback control. Speed in the rotary load may be regulated (86) in a particular example case by controlling fuel flow to gas generator(s) coupled to turbine(s) used to drive the rotary load(s), although rotor speed control may be effected differently in variant embodiments as well.

So as to effect active damping of rotor speed oscillations within free spinning turbine(s), in addition to rotor speed control, the resonance component ($\omega$) of the sensed rotor speed ($\Omega$) may also be determined (88) and used as a basis for estimating (90) a component of rotor acceleration associated with the resonant mode speed oscillations. In some embodiments, the measured resonance component ($\omega$) of the sensed rotor speed ($\Omega$) may be isolated from the average speed component ($\Omega_0$), and input into a state observer configured to estimate the rotor acceleration component based on the measured resonance component ($\omega$). For this purpose, a suitable state model to describe the dynamic characteristics of the rotor speed oscillations may be devised and used to provide accurate estimates of physically un-measurable or difficult-to-measure quantities, such as rotor acceleration. In some cases, speed oscillations in the free spinning turbine(s) may be modeled as a linear, non-linear or adaptive (dynamic) second order oscillator.

Based on the estimated rotor acceleration generated in the state observer, for example, an adjustment value for a speed control path may be determined (92). In at least some cases, the adjustment value may be determined so that resonant mode speed oscillations in a rotary load are actively damped through compensation (94) of the speed control path, which may be a decrease in requested speed to at least partially counteract the estimated rotor acceleration and thereby dampen speed oscillations in a rotary load, e.g., which may be caused by or attributable to resonance.

Figure 7A:
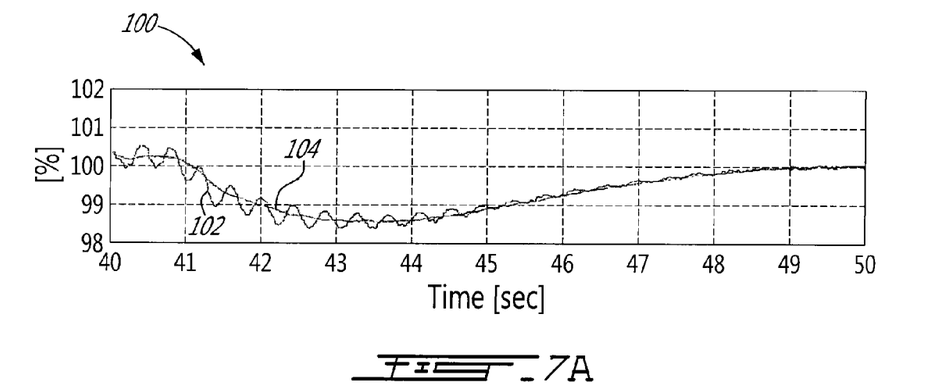
FIGS. 7A-7C are graphs illustrating operation of the speed control system of FIG. 2 and/or the method of FIG. 6.
Figure 7B:
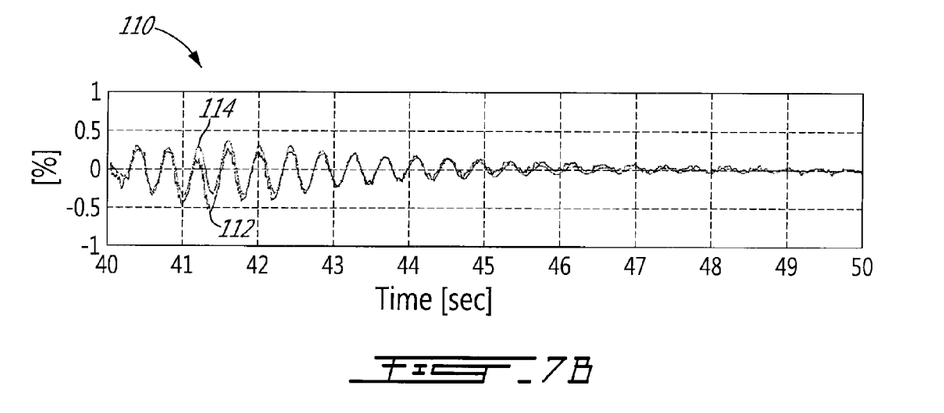
Figure 7C:
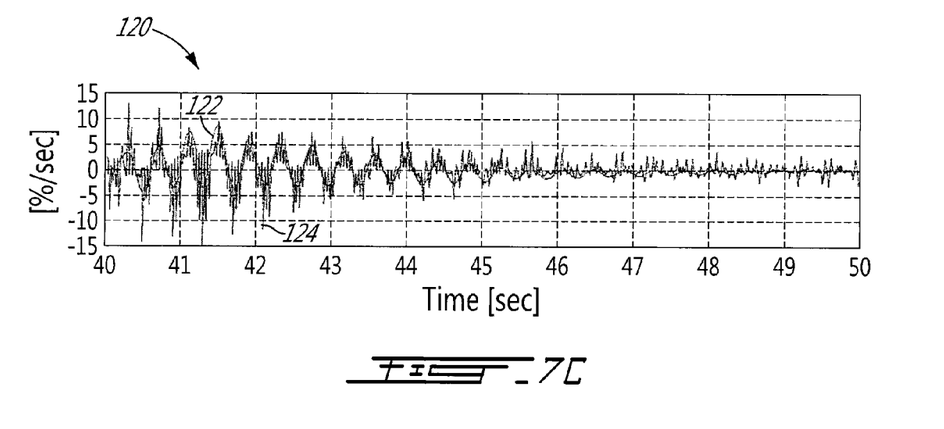

Referring now to FIGS. 7A-7C, operation of a speed control system 20 (FIGS. 2-5) and a method 80 (FIG. 6) for controlling speed in a rotary engine is explained in further detail showing plots of different variables and/or parameters utilized in such system(s) and/or method(s). FIG. 7A shows a graph 100 of rotor speed as a function of time in response to a disturbance from regulated levels, for example, as might be caused by a CLP (cleaner lubricant preservative) pull or the like.

In graph 100, curve 102 represents a sensed rotor speed ($\Omega$) of a rotary load that is experiencing resonant mode speed oscillations, and curve 104 represents a filtered version of curve 102 in which such speed oscillations have been substantially attenuated. As seen in graph 100, filtering of a sensed rotor speed ($\Omega$) may produce a relatively smooth, dc or near dc valued speed signal without high frequency oscillations that might render the signal unsuitable for performing rotor speed control. For example, curve 102 may illustrate example values and transient characteristics of rotor speed signal 30 provided to signal separator 26, and curve 104 may illustrate example values and transient characteristics of average rotor speed signal 32 generated by signal separator 26 and provided, directly or indirectly, to rotor speed controller 22 (FIGS. 2 and 5).

FIG. 7B shows a graph 110 depicting rotor speed as a function of time, in which curve 112 represents a resonance component ($\omega$) of a sensed rotor speed ($\Omega$). Thus, curve 112 may represent the relatively high-frequency component of curve 102, for example, which may also be determined approximately by taking the difference between curves 102 and 104. In graph 110, curve 114 represents an estimate of the resonance component ($\hat{\omega}$), which may be generated by a state observer configured to model transient characteristics of the resonance component ($\omega$), as well as higher order derivatives thereof. For example, the state observer may be constructed around a second order oscillator state model of resonant mode speed oscillations in a rotary load. The close correspondence between curves 112 and 114 confirms the suitability of such a state model for estimating a component of rotor acceleration associated with the resonant mode speed oscillations. Thus, for example, curve 112 may illustrate example values and transient characteristics of a resonant mode signal 34 provided to resonance disturbance rejection controller 24 (FIGS. 2 and 5), in which case curve 114 may represent a signal generated internally within acceleration estimator 66 or state observer 72 particularly.

FIG. 7C shows a graph 120 depicting a time rate of change of rotor speed as a function of time. Thus, in graph 120, curve 122 represents an estimated rotor acceleration ($\hat{\dot{\omega}}$), for example, as generated and output from a state observer configured based on a resonance component ($\omega$) of a sensed rotor speed ($\Omega$), i.e., signal 112. The signal waveform depicted in curve 122 is relatively smooth and clean, making the signal waveform suitable for active damping of resonant mode rotor speed oscillations. In contrast, curve 124 represents an estimate of rotor acceleration generated taking the derivative of the observed resonant component ($\omega$), i.e., the derivative of signal 112. Compared to curve 122, curve 124 exhibits a rugged and noisy signal waveform that is less suitable for active rotor damping. For example, curve 122 may illustrate example values and transient characteristics of estimated rotor acceleration signal 70 generated by acceleration estimator 66 (FIG. 4), or state observer 72 (FIG. 5A) and provided to speed control compensator 68 (FIG. 4).

Figure 8A:
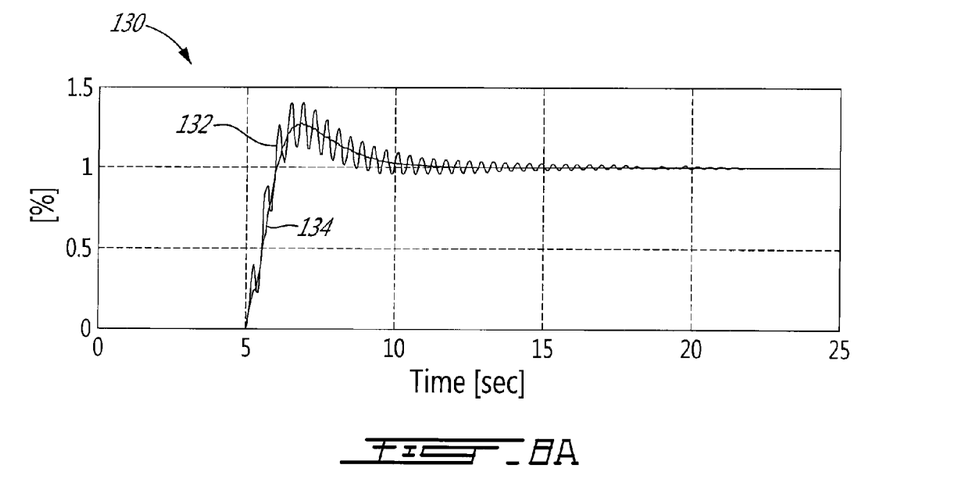
FIGS. 8A-8B are graphs illustrating operation of the speed control system of FIG. 2 and/or the method of FIG. 6.
Figure 8B:
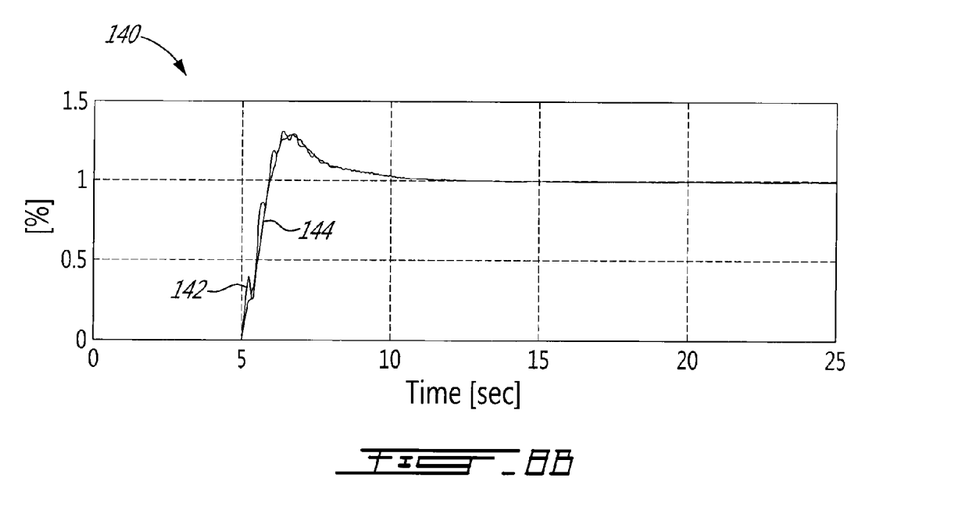

Referring now to FIGS. 8A and 8B, operation of a speed control system 20 (FIGS. 2-5) and a method 60 (FIG. 6) for controlling speed in a gas turbine engine is further explained with reference to transient characteristics of such system(s) and/or method(s). FIG. 8A shows a graph 130 of rotor speed as a function of time for a rotary load undergoing a step change in requested speed, in this particular case, with no active damping of any resonant mode speed oscillations that may happen to develop. Curve 132 represents a sensed rotor speed ($\Omega$) including both a resonance component ($\omega$) reflecting such speed oscillations and an average speed component ($\Omega_0$), while curve 134 represents a filtered version of curve 132 in which the resonance component ($\omega$) has been substantially attenuated. As can be seen from the relatively slow settling time of curve 132 following a commanded change in rotor speed, in many cases, very little naturally occurring damping of resonant speed oscillations may be provided in free spinning turbine(s).

FIG. 8B shows a graph 140 of rotor speed as a function of time for a rotary load undergoing a step change in requested speed, but now under further control to provide active damping of resonant mode speed oscillations. Curve 142 represents a sensed rotor speed ($\Omega$) including both a resonance component ($\omega$) reflecting such speed oscillations and an average speed component ($\Omega_0$), while curve 144 represents a filtered version of curve 132 in which the resonance component ($\omega$) has been substantially filtered. In contrast to curve 132, curve 144 exhibits a comparatively faster settling time on account the active damping applied to the resonant mode speed oscillations, such that curve 142 converges with curve 144 much quicker than curve 132 converges with curve 134. Faster settling times of resonant mode speed oscillations may tend to increase the stability of rotor speed control loops and thereby provide more responsive and robust operation of certain rotary aircraft.

The above description is meant to be exemplary only, and one skilled in the art will recognize that changes may be made to the embodiments described without departing from the scope of the invention disclosed. For example, a resonance disturbance rejection controller was described in the context of speed control system(s) and method(s) that regulate speed in turbine-driven rotary loads included in gas turbine or other types of rotary engines. Within this context, certain control signals specifically may be modified so as to provide active damping of resonant mode speed oscillations. However, the described embodiments of a resonance disturbance rejection controller may be modified so as to operate by adjusting one or more different control signals for one or more different engine configurations, as the case may be. The described embodiments of a resonance disturbance rejection controller also made use of a state observer designed and configured around a second order oscillator model of speed oscillations in a rotary load. In variant embodiments, different approaches to estimating rotor acceleration may be utilized, including use of different, potentially higher-order system models, as well as non-linear and/or adaptive models. Different approaches to signal filtering may also be utilized so as to isolate average and resonant components of a sensed rotor speed. Still other modifications to the described embodiments may be suggested by or apparent from the present disclosure.

The scope of the invention is to be defined solely by the appended claims, giving due consideration to applicable rules and principles of construction, such as the doctrine of equivalents and related doctrines, which may be utilized so as to understand the full scope and meaning of such claims as is consistent with the intentions expressed or otherwise implied within this disclosure.

What is claimed is:

1. A speed control system for an engine comprising at least one rotary load, the speed control system comprising:
    a signal separator configured to filter a rotor speed signal into a resonant component and an average speed component that is representative of an average speed in the rotary load determined exclusive of speed oscillations;
    a rotor speed controller configured to generate a speed control signal based on the average speed component so as to regulate speed in the rotary load, wherein the rotor speed signal is representative of a sensed speed in the rotary load;
    a resonance disturbance rejection controller configured to generate a resonance compensation signal based on the resonance component of the rotor speed signal, wherein the resonance component is representative of the speed oscillations in the rotary load caused by development of a resonance condition wherein the resonance disturbance rejection controller comprises:
        an acceleration estimator configured to estimate an acceleration component associated with the speed oscillations based on the resonance component of the rotor speed signal,
        wherein the acceleration estimator comprises a state observer configured to observe the resonance component of the rotor speed signal, and to estimate the acceleration component based on the observed resonance component and a state model of the speed oscillations; and
        a speed control compensator configured to generate the resonance compensation signal so as to provide an adjustment value for the speed control signal determined based on the estimated acceleration component; and
    a summing junction to adjust the speed control signal based on the resonance compensation signal so as to effect active damping of the speed oscillations.

2. The speed control system of claim 1, wherein the state model comprises a second order oscillator.

3. The speed control system of claim 1, wherein the speed control compensator comprises a gain multiplier configured to calculate the adjustment value by applying a gain factor to the estimated acceleration component.

4. The speed control system of claim 1, wherein the engine comprises a gas generator coupled to at least one turbine for driving the rotary load, and the speed control signal determined by the rotor speed controller is configured to regulate speed in the turbine-driven rotary load by controlling fuel flow to the gas generator.

5. A method of controlling speed in an engine comprising at least one rotary load, the method comprising:
    regulating speed in the rotary load based on an average speed component of a sensed speed of the rotary load;
    determining a resonance component of the sensed speed that is representative of speed oscillations in the rotary load caused by development of a resonance condition, wherein the resonance component is determined by filtering the sensed speed into the resonance component and the average speed component that is representative of the average speed in the rotary load determined exclusive of the speed oscillations;
    adjusting the regulated speed based on the determined resonance component so as to effect active damping of the speed oscillations;
    estimating an acceleration component associated with the speed oscillations based on the resonance component of the sensed speed;
    determining an adjustment value for the regulated speed based on the estimated acceleration component;
    observing the resonance component of the sensed speed; and
    estimating the acceleration component based on the observed resonance component and a state model of the speed oscillations.

6. The method of claim 5, wherein the rotor speed oscillations are modeled as a second order oscillator.

7. The method of claim 5, further comprising calculating the adjustment value by applying a gain factor to the estimated acceleration component.

8. The method of claim 5, wherein the engine comprises a gas generator coupled to at least one turbine for driving the rotary load, and speed in the turbine-driven rotary load is regulated by controlling fuel flow to the gas generator.

9. A resonance disturbance rejection controller for an engine comprising
    at least one rotary load the speed of which is regulated using a speed control signal, the resonance disturbance rejection controller implemented by at least one processor configured to generate a resonance compensation signal based on a resonance component of a rotor speed signal, wherein the rotor speed signal is representative of a sensed speed of the rotary load, and the resonance component is representative of speed oscillations in the rotary load caused by development of a resonance condition, and the processor further configured to adjust the speed control signal based on the resonance compensation signal so as to effect active damping of the speed oscillations;
    wherein the resonance disturbance rejection controller comprises:
        an acceleration estimator configured to estimate an acceleration component associated with the speed oscillations based on the resonance component of the rotor speed signal; and
        a speed control compensator configured to generate the resonance compensation signal so as to provide an adjustment value for the speed control signal determined based on the estimated acceleration component; and
    wherein the acceleration estimator comprises:
        a state observer configured to observe the resonance component of the rotor speed signal, and to estimate the acceleration component based on the observed resonance component and a state model of the speed oscillations.

10. The resonance disturbance rejection controller of claim 9, wherein the state model comprises a second order oscillator.

11. The resonance disturbance rejection controller of claim 9, wherein the speed control compensator comprises a gain multiplier configured to calculate the adjustment value by applying a gain factor to the estimated acceleration component.

12. The resonance disturbance rejection controller of claim 9, wherein the engine comprises a gas generator coupled to at least one turbine for driving the rotary load, and the speed control signal adjusted by the resonance compensation signal is configured to regulate speed in the rotary load by controlling fuel flow to the gas generator.

* * * * *